United States Patent [19]

Ohga

[11] Patent Number: 5,316,870
[45] Date of Patent: May 31, 1994

[54] HEAT SUPPLY AND ELECTRIC POWER-GENERATING FUEL CELL

[75] Inventor: Shunsuke Ohga, Kawasaki, Japan
[73] Assignee: Fuji Electric Co., Ltd., Kanagawa, Japan
[21] Appl. No.: 887,828
[22] Filed: May 26, 1992
[30] Foreign Application Priority Data
  May 27, 1991 [JP] Japan .................. 3-120521
[51] Int. Cl.$^5$ .......................... H01M 8/04
[52] U.S. Cl. ........................ 429/24; 429/26
[58] Field of Search ............... 429/24, 26; 165/58

[56] References Cited

U.S. PATENT DOCUMENTS

| | | | |
|---|---|---|---|
| 2,720,936 | 10/1955 | Beu | 165/58 X |
| 3,539,397 | 11/1970 | Keating et al. | 429/24 X |
| 3,653,431 | 4/1972 | Loveley | 165/58 X |
| 3,952,794 | 4/1976 | Spanoudis | 165/58 X |
| 4,824,740 | 4/1989 | Abrams et al. | 429/24 |
| 5,023,151 | 6/1991 | Landau et al. | 429/24 |

Primary Examiner—Stephen Kalafut
Attorney, Agent, or Firm—Spencer, Frank & Schneider

[57] ABSTRACT

A heat supply and electric power-generating fuel cell, has a water-circulation system including a fuel cell body with a water flow path for controlling the temperature of a cell reaction to a proper temperature. A water vapor separator cools water passed through the water flow path of the fuel cell. A recovery heat exchanger supplies heat to users which corresponds to the difference between the temperature of the water cooled by the separator and the proper temperature of the cell reaction when the temperature of the water is greater than the proper temperature. A control heat exchanger, on a water path connecting the separator with the recovery heat exchanger, includes a heat exchange portion having a path for a heat transfer medium, and cooling structure for cooling the water with air. A circulating pump circulates water around a water-circulation circuit. An external controller controls the quantity of heat from the heating/cooling structure to adjust the temperature of water heat-exchanged with the heat exchange portion when the temperature of the cell reaction is reduced, and controls the quantity of air supplied from the heating/cooling structure toward the heat exchange portion when the temperature of the cell reaction is increased.

6 Claims, 4 Drawing Sheets

HEAT SUPPLY AND ELECTRIC POWER-GENERATING FUEL CELL

BACKGROUND OF THE INVENTION

1. Field of the Invention

The present invention relates to a heat supply and electric power-generating fuel cell in which a body of a fuel cell incorporated into a fuel cell power generator is heated with hot water during starting to preheat the cell body and cooled by cooling water during power-generation to remove a part of the heat of reaction, whereby the temperature of the cell body is maintained at a constant level while supplying heat to users.

2. Description of the Prior Art

There has been known a fuel cell to be incorporated into a fuel cell power generator whose fuel cell body is cooled with cooling water to remove a part of the heat generated during the power-generation and to thus maintain the fuel cell body at a predetermined operating temperature and which can thus supply heat to users through the heat exchange between the cooling water thus heated and a proper heat transfer medium. The fuel cell is further equipped with a means for heating, with hot water, the fuel cell body up to a temperature suitable for the cell reaction during starting of the fuel cell. FIG. 1 is a system diagram showing a fuel cell power generator provided with such a conventional fuel cell.

In FIG. 1, a fuel cell body 1 is schematically depicted and has a plurality of units cells, which are put on top of each other and each comprises a fuel electrode 2, an oxide electrode 3 and a phosphoric acid electrolyte layer (not shown) sandwiched between these electrodes, and a cooling plate 5 having with cooling pipes 4 which are provided for every unit cells and serve as water flow paths.

In a fuel-reforming apparatus 7, a starting gas such as a natural gas supplied thereto through a fuel supply system 8 is heated by water vapor supplied from a water vapor separator 21, as will be detailed below, through a water vapor supply system 10 as well as the heat generated during combustion of an off-gas in a burner (not shown) in the presence of a reforming catalyst, as will be detailed below, to give a reformed gas rich in hydrogen.

The fuel cell body 1 and the fuel reforming apparatus 7 are communicated to one another through a reformed gas supply system 11 and an off-gas supply system 12 to form a circulation system for the reformed gas, the reformed gas supply system serving as a means for supplying the reformed gas generated in the fuel-reforming apparatus 7 to the fuel electrode 2 of the fuel cell body 1 and the off-gas supply system serving as a means for supplying an off-gas including hydrogen gas, which is discharged from the fuel electrode 2 and does not take part in the cell reaction, to the burner of fuel-reforming apparatus as a fuel.

Moreover, the fuel cell body I is connected to an air supply system 14 having a blower 13 for supplying air to the oxide electrode 3 and an air exhaust system 15 for evacuating the air used in the cell reaction. Reference numeral 16 represents a thermometer for detecting the temperature of the fuel cell body 1.

To circulate cooling water through the fuel cell body 1 during power-generation, the cooling pipes 4 fitted to the cooling plate 5 of the fuel cell body 1 are connected to a water-circulation system 20 which has water vapor separator 21, a pump 22 for circulating the cooling water and a heat exchanger 23 for recovering heat.

The water vapor separator 21 serves to separate water vapor from the water discharged from the cooling pipes 4 of the fuel cell body 1. The water vapor separated is transferred to the fuel-reforming apparatus 7 through the water vapor supply system 10 in which it is admixed with a starting fuel. Reference numeral 24 represents a thermometer for detecting the temperature of the water in the water vapor separator 21.

The heat exchanger 23 for recovering heat serves to recover the heat of the water having an elevated temperature. In the heat exchanger 23, the temperature of a heat transfer medium to be supplied to users is raised through the heat-exchange with the heated cooling water and the heat transfer medium is supplied to the users through a heat transfer medium supply system 25.

In addition to the water-circulation system 20, the water vapor separator 21 further has a water-circulation system 31 for starting the fuel cell body, which serves to supply the water separated in the water vapor separator 21 to a circulating pump 27 for starting through a heat exchanger 30 for heating which comprises a heat exchange part 29 having a heating burner 28 and to then return the water to the water vapor separator 21.

In the heat exchanger 30 for heating, the fuel fed thereto through a fuel supply system 32 is combusted by the heating burner 28 while supplying a combustion air fed thereto through a combustion air supply system 33 and the temperature of the water fed to the heat exchanger is raised through the heat exchange between the heat transfer medium generated during the combustion and the water.

Upon starting a fuel cell having such a structure, the circulating pump 27 for starting the cell of the system 31 for circulating the starting water is started and simultaneously the combustion of the fuel is started by igniting the heating burner 28, whereby the water in the water vapor separator 21 is circulated along the system 31 for circulating the starting water and simultaneously heated to 170° C. by the action of the heat generated during combustion of the fuel in the heating burner 28 to give water vapor.

The pump 22 for circulating cooling water during operation of the system 20 is operated to circulate the heated water in the water vapor separator 21 through the system 20 for circulating water for operation and the cooling pipes 4 within the cooling plate 5 of the fuel cell body 1 to thus heat fuel cell body 1 and raise the temperature of the cell body up to a level suitable for progressing the cell reaction. After completion of the desired temperature rise, the circulating pump 27 for starting the cell and the heating burner 28 are stopped.

At the time when the temperature of fuel cell body 1 reaches a desired level, the reformed gas generated in the fuel-reforming apparatus 7 is fed to the fuel electrode 2 through reformed gas supply system 11, while air is supplied to the oxide electrode 3 by the blower 13 through the air supply system 14 and thus the fuel cell body 1 causes the cell reaction to produce electric power. The heat generated during the cell reaction is removed by the water circulating through the water-circulation system 20 for operation and correspondingly the temperature of the fuel cell is maintained at a predetermined level.

The off-gas generated during the cell reaction is fed to the burner of the fuel-reforming apparatus 7 through the off-gas supply system 12 while exhaust air used in the cell reaction is released in the air through the air exhaust system 15.

Incidentally, the water whose temperature is raised through the cooling of fuel cell body 1 transfers heat to a heat transfer medium such as water through heat-exchange within the heat exchanger 23 for recovering heat and the heat transfer medium thus heated to an elevated temperature is supplied to users in the form of steam.

When a fuel cell having the foregoing structure produces electric power and simultaneously provides heat by making use of the heat of reaction during the power-generation, a desired quantity of heat must always be supplied to the fuel cell to produce a predetermined quantity of electric energy. For this reason, for instance, the temperature and pressure of the steam as a heat transfer medium to be supplied to users are controlled to predetermined ranges respectively. In such a heat supply and powergenerating system, however, a demand for heat is not always proportional to that for generated energy. For instance, if the demand for heat is lower than that for electric power, users must deal with the excess or residual heat. On the other hand, even if the demand for heat is greater than that for the electric power, the temperature and pressure of the steam to be supplied to users are controlled to predetermined ranges for preventing any reduction in the operating temperature of the fuel cell. This leads to a limitation in the quantity of heat to be supplied.

If the temperature and pressure of the steam are not controlled to predetermined ranges and the operating temperature of the fuel cell is dropped because of an increase in heat used by users over the heat of reaction generated during the power-generation, the desired temperature of fuel cell body 1 may be maintained by heating the water in the water vapor separator 21 through the operation of the pump 27 for circulating the starting water and heating burner 28. In this case, however, this operation results in a delay of the response of the fuel cell for a time required for raising temperature to a desired level due to the high heat capacity of the water. More specifically, it takes a long time period from the detection of the temperature drop in the fuel cell till the operation temperature thereof reaches the predetermined level by operating the heating burner.

In general, the fuel cell power generator requires a large area for establishment per unit output as compared with other kinds of power generators. Accordingly, there has been a demand for making the generator more compact through elimination of unnecessary parts and-/or integration of two or more of parts.

SUMMARY OF THE INVENTION

It is an object of the present invention to provide a heat supply and electric power-generating fuel cell which has a wide allowance in the unbalance between the demand for power-generation and that for the heat or can widely vary both demand for generated energy and heat during operation of the fuel cell and supply of heat to users and which is very compact.

In a first aspect of the present invention, the heat supply and electric power-generating fuel cell comprise a water-circulation system which includes a fuel cell body having a water flow path for controlling the temperature of a cell reaction to a proper level; a water vapor separator for separating water vapor from water discharged from the water flow path of the fuel cell body; a first heat exchanger for heating water discharged from the water vapor separator through heat exchange between water discharged from the water vapor separator and a heated first heat transfer medium; a second heat exchanger for recovering heat from water heated by the first heat exchanger through heat exchange between water heated by the first heat exchanger and a second heat transfer medium for supplying heat to users; and a circulating pump for returning water, which is cooled through heat exchange performed in the second heat exchanger, to the water vapor separator.

The first heat exchanger may have a heat exchange part for performing heat exchange and a heating burner for heating a heat transfer medium which is present in the heat exchange part. The heat exchange part of the first heat exchanger may be a part for exchanging heat between water discharged from the water vapor separator and the heat transfer medium heated by the heating burner of the first heat exchanger.

The heat exchange part of the first heat exchanger may also be a part for exchanging heat between water discharged from the water vapor separator and the combustion air discharged from the heating burner of the first heat exchanger.

A selector valve may be arranged in the path between the second heat exchanger and the flow path of the fuel cell body of the water circulation system, the selector valve selecting either or both of the paths which serve to return water discharged from the second heat exchanger to the water vapor separator through the flow path.

In a second aspect of the present invention, the heat supply and electric power-generating fuel cell comprise a water-circulation system which includes a fuel cell body having a water flow path for controlling the temperature of a cell reaction to a proper level; a water vapor separator for separating water vapor from water discharged from the water flow path of the fuel cell body; a heat transfer medium-heat exchanger having a heat transfer medium the heat transfer medium-heat exchanger for exchanging heat between water discharged from the water vapor separator and the heat transfer medium; an air-heat exchanger for exchanging heat between water discharged from the water vapor separator and air, the air-heat exchanger and the heat transfer medium-heat exchanger disposed in series; a recovering heat exchanger for recovering heat from water heated by a series of the heat exchangers through heat exchange between water heated by a series of the heat exchangers and a second heat transfer medium for supplying heat to users; and a circulating pump for returning water, which is cooled through heat exchange performed in the recovering heat exchanger, to the water vapor separator.

A selector valve may be arranged in the path between the recovering heat exchanger and the flow path of the fuel cell body of the water circulation system, the selector valve selecting either or both of the paths which serve to return water discharged from the recovering heat exchanger to the water vapor separator through the flow path.

In a third aspect of the present invention, the heat supply and electric power-generating fuel cell comprise a water-circulation system which includes a fuel cell body having a water flow path for controlling the temperature of a cell reaction to a proper level; a water vapor separator for separating water vapor from water discharged from the water flow path of the fuel cell body; an integrated heat exchanger for simultaneously performing heating and heat-recovery among water discharged from the water vapor separator, a heated first heat transfer medium and a second heat transfer medium to be supplied to users; and a circulating pump for returning water, which is cooled through heat exchange performed in the integrated heat exchanger, to the water vapor separator.

A selector valve may be arranged in the path between the integrated heat exchanger and the flow path of the fuel cell body of the water circulation system, the selector valve selecting either or both of the paths which serve to return water discharged from the integrated heat exchanger to the water vapor separator through the flow path.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
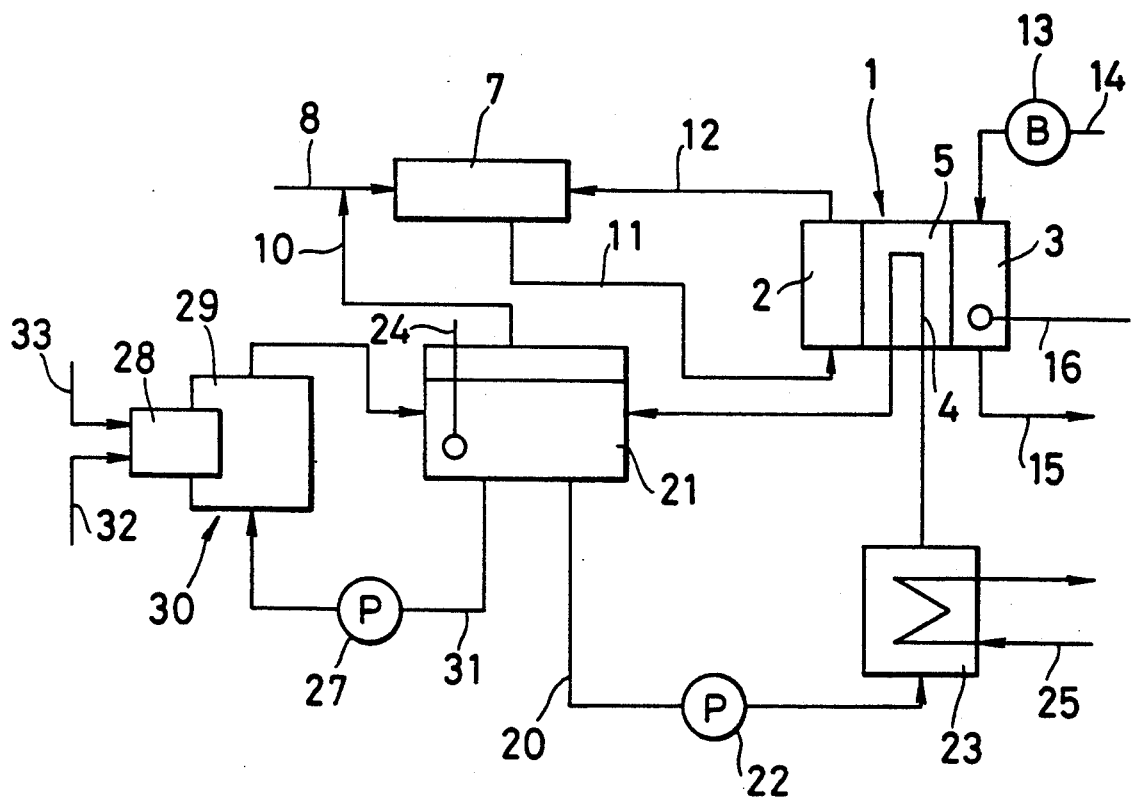
FIG. 1 is a block diagram showing a fuel cell power generator provided with a conventional heat supply and power-generating fuel cell.

Embodiments of the present invention will hereinafter be described in more detail with reference to the accompanying drawings. FIG. 1 is a system diagram showing a fuel cell power generator provided with an embodiment of the heat supply and power-generating fuel cell according to the present invention. For the sake of simplicity, the same parts appearing on FIG. 2 and FIGS. 3 to 5 as will be explained below as those appearing on FIG. 1 are denoted by the reference numerals used in FIG. 1 and explanation thereof is omitted.

Figure 2:
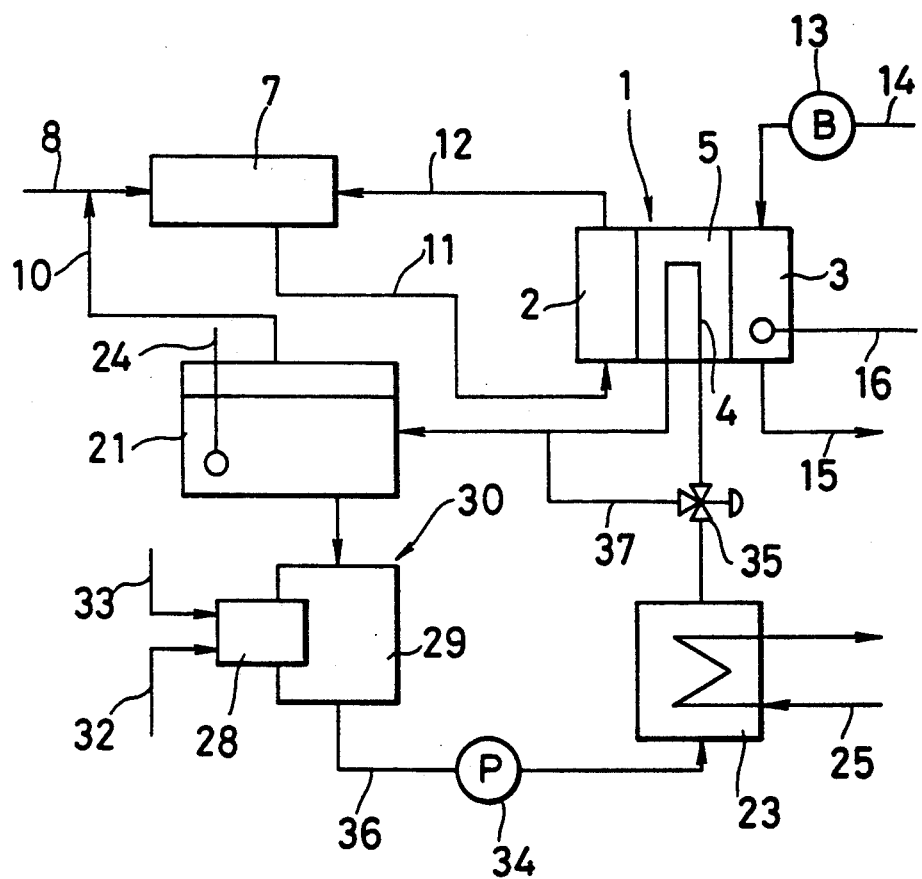
FIG. 2 is a block diagram showing a fuel cell power generator provided with an embodiment of the heat supply and power-generating fuel cell according to the present invention.

The fuel cell of the present invention shown in FIG. 2 differs from the conventional one shown in FIG. 1 in that the former is provided with a water circulation system 36 having a heat exchanger 30 for heating as a first heat exchanger which has the water vapor separator 21 and the heat exchanger 29 provided with the heating burner 28; a circulating pump 34 for feeding the circulating water discharged from that exchanger 30 under pressure, the heat exchanger 23 for recovering that as a second heat exchanger, a three-way selector valve 35 for returning the circulating water discharged from the heat exchanger 23 to the cooling plate 5 or the water vapor separator 21, instead of the water circulation system 20 for staring the fuel cell as shown in FIG. 1. A water circulation system 36 is provided with a bypass system 37 for returning the circulating water to the water vapor separator 21 through a three-way selector valve 35.

In the fuel cell having the foregoing construction, the circulating water flows in the direction of the water vapor separator 21 through the by-pass system 37 by switching the three-way selector valve 35 during starting the fuel cell. Under such a condition, the circulating water in heat exchanger 30 is heated, during starting the fuel cell, by igniting the heating burner 28 of the heat exchanger 30 to a temperature of 170° C. to give water vapor as has already been discussed above.

The three-way selector valve 35 is switched to flow the heated circulating water into the cooling pipe 4 of the cooling plate 5. Thus, fuel cell body 1 is heated by the heated circulating water up to a temperature suitable for the cell reaction. When fuel cell body 1 is heated, the circulating water released from the water vapor separator 21 of water circulating system 36 is heated through the heat exchange with a heat transfer medium generated by the combustion of the heating burner 28 of the heat exchanger 30 and the whole heated circulating water is returned to the water vapor separator 21 by switching the three-way selector valve 35. In such a manner, the circulating water is continuously heated and circulated until the temperature thereof reaches a predetermined level suitable for the cell reaction in fuel cell body 1.

After the completion of the heating of the water, the three-way selector valve 35 is switched so that the whole water is supplied to the cooling plate 5 to thus elevate the temperature of fuel cell body 1 to a level favorable for the cell reaction. After the completion of the temperature rise, the combustion of the heating burner 28 is stopped.

In this respect, the flow rate of the circulating water in the cooling pipe 4 of fuel cell body 1 can be controlled by gradually varying the opening angle of the three-way selector valve 35 so that the thermal shock exerted on fuel cell body 1 would be relieved.

As has been discussed above, the cell reaction is initiated by supplying a reformed gas and air to the fuel cell body 1 after the temperature of the fuel cell body 1 is raised to a predetermined level to produce electric power. The circulating water is cooled through the heat exchange with a heat transfer medium to be supplied to users in the heat exchanger 23 for heat-recovery by flowing it into the water circulation system 36 during the power-generation and the cooled circulating water is supplied to the fuel cell body 1 to remove heat generated during the production of electric power and to, in turn, hold the desired operating temperature of the fuel cell boy 1 as described above.

The operating temperature of the fuel cell during power generation is greatly affected by the temperature and flow rate of the heat transfer medium supplied, on the user side, to heat exchanger 23 for recovering the that of reaction generated accompanied by the power-generation. Therefore, the operating temperature of the fuel cell is controlled by the circulating water through the heat exchange in the heat exchanger 30 of the water circulation system 36 while monitoring the operating temperature of the fuel cell, whereby excess heat can be discharged or deficiency of heat can be compensated so as to lighten the burden of the user. The problems of the excess heat and the deficiency of heat arise due to the unbalance between the demand for the generated energy and that of the heat extracted through the heat exchange in the heat exchanger for heat recovery.

In other words, if the quantity of heat extracted from the heat exchanger for heat recovery is greater than the heat generated through the cell reaction accompanied by the power-generation in the fuel cell and the operating temperature of the fuel cell is correspondingly reduced, the reduction of the temperature of the circulating water is detected by the thermometer 16 of the fuel cell body 1. The circulating water is heated in the heat exchanger 30 by igniting the heating burner 28 which is controlled by a controller (not shown) on the basis of data from the thermometer 16 to adjust the quantity of heat obtained by the heating burner 28. The fuel cell body 1 is heated through the circulation the heated circulating water to thus hold the desired operating temperature thereof.

On the other hand, if the quantity of heat extracted from the heat exchanger for heat recovery is smaller than the heat generated through the cell reaction accompanied by the power-generation in the fuel cell and the operating temperature of the fuel cell is correspondingly increased, the increase of the temperature of the circulating water is detected by the thermometer 16 of the fuel cell body 1. The circulating water is cooled by supplying only the combustion air to the heating burner 28 without igniting the same and the fuel cell body 1 is cooled through the circulation of the cooled circulating water to thus hold the desired operating temperature thereof.

Since it is not necessary, in the apparatus having the foregoing structure, to heat the circulating water by the water circulation system through the water vapor separator 21 as in the conventional apparatus, the apparatus of the present invention can eliminate the problem of a delay of the response of the fuel cell for a time required for raising temperature to a desired level due to the high heat capacity of the water and further the apparatus of the present invention can deal with the unbalanced relation between the demand for the generated energy and that for the heat consumption or makes it possible to widely vary the interrelation therebetween.

In this case, the ability of the heating burner 28 and that of the heat exchanger 29 to transfer heat to the circulating water by the combustion of the burner through the heat transfer medium must be determined in advance by examining the ratio of the demand for generated energy to that for heat in the apparatus as a co-generation system.

Figure 3:
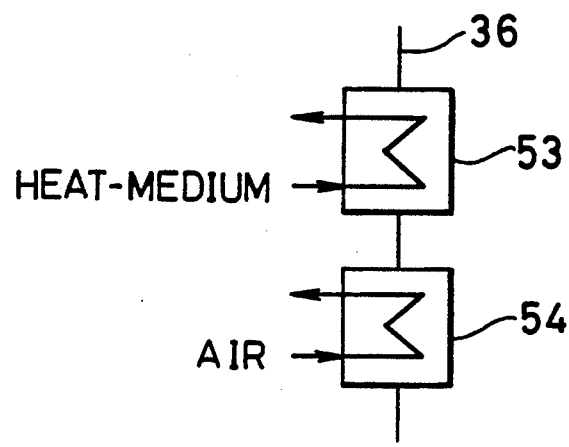
FIG. 3 is a partial block diagram showing a heat transfer medium-heat exchanger and an air-heat exchanger capable of being incorporated in the heat supply and power-generating fuel cell as shown in FIG. 2.

Alternatively, it is also possible to arrange a heat transfer medium-heat exchanger 53 which performs that exchange between the circulating water and a heat transfer medium such as a heat transfer oil and an air-heat exchanger 54 in which heat is exchanged with air in series with water circulation system 36 as shown in FIG. 3, instead of heat exchanger 30 for heating shown in FIG. 1 so that a high temperature heat transfer oil is supplied to the heat transfer medium-heat exchanger 53 when it is needed to heat the circulating water, while low temperature air is fed to the air heat exchanger 54 when it is intended to cool the circulating water, in order to heat or cool the circulating water.

This embodiment has the water circulating system 36 which circulates the circulating water, which heats the fuel cell body 1 during starting the fuel cell body and removes heat of reaction during operating the fuel cell body, through the cooling plate 5, the water vapor separator 21, the heat exchanger 30 for heating or the heat transfer medium and air-heat exchanger 54 and the heat exchanger 53 for removing heat by the action of the circulating pump 34 during operation of the fuel cell body and which allows for the circulating water to bypass the cooling plate 5 and accordingly, the temperature rise of the fuel cell body 1 during starting as well as the temperature rise and drop of fuel cell body 1 during power-generation are performed without using a cooling water circulation system for starting as in the conventional fuel cell. Consequently, the temperature rise and drop of the circulating water can be achieved without accompanying any delay of the response of the fuel cell for a time required for raising temperature to a desired level due to the high heat capacity of the water. In particular, the fuel cell can quickly respond to a possible unbalance between the demand for the generated energy during production of electric power and that for the heat consumption and can thus recover the desired operating temperature of the fuel cell. In other words, the cell can deal with a great unbalance between the demand for the generated energy and that for the heat consumption.

Figure 4:
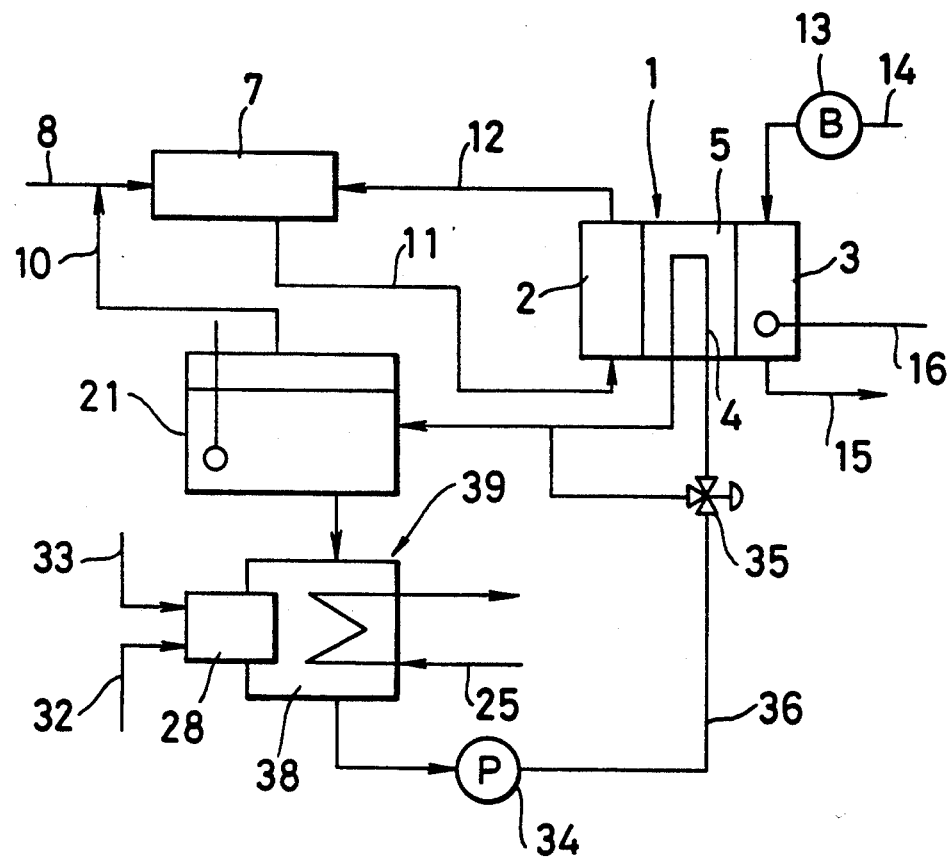
FIG. 4 is a block diagram showing a fuel cell power generator provided with another embodiment of the heat supply and power-generating fuel cell according to the present invention.

FIG. 4 is a system diagram showing a fuel cell power generator provided with another embodiment of the heat supply and power-generating fuel cell according to the present invention. The apparatus shown in FIG. 4 is identical to that shown in FIG. 2 except that it has an integrated heat exchanger 39 having a heating burner 28 and a heat exchanger 38 and which simultaneously has functions of both that exchanger 23 and heat exchanger 30 having heat exchanger 29 provided with the heating burner 28 (see FIG. 2), the integrated heat exchanger being incorporated into the water circulation system 36 between the water vapor separator 21 and circulating pump 34.

Figure 5:
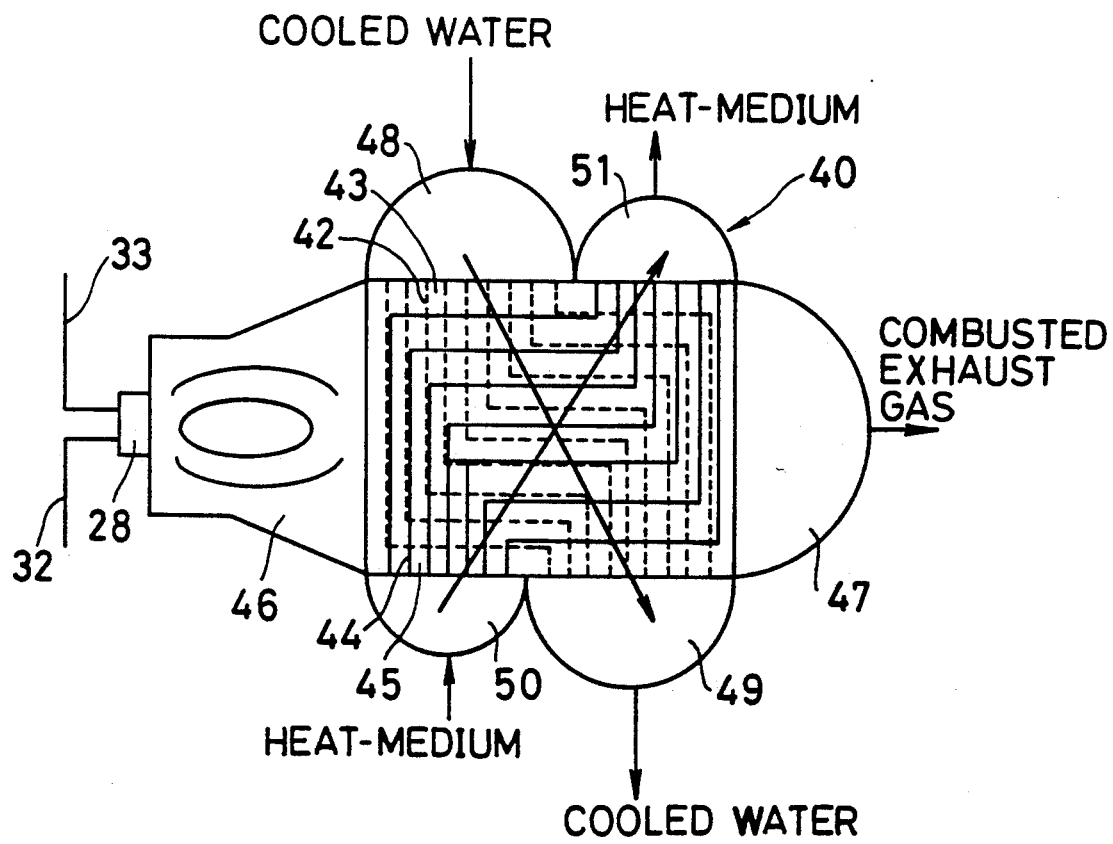
FIG. 5 is an enlarged block diagram illustrating an integrated heat exchanger to be incorporated into the heat supply and power-generating fuel cell as shown in FIG. 4.

The integrated heat exchanger 39 is a plate type heat exchanger as shown in FIG. 5. Alternatively, it may be a plate-fin type heat exchanger. As shown in FIG. 5, the integrated heat exchanger 39 is provided with the heating burner 28 at one end of a casing 40. The casing 40 has a flow path through which a combustion gas generated by igniting the heating burner 28 passes, a flow path 43 defined by separators 42 through which circulating water flows and a flow path 45 defined by separators 44 through which a heat transfer medium supplied by users passes, the flow paths being put in layers through heat transfer plates. Such an integrated heat exchanger 39 makes it possible to perform heat exchange between the combustion gas, the cooling water and the heat transfer medium.

In FIG. 5, reference numeral 46 represents a combustion chamber in which combustion is performed by the heating burner 28; reference numeral 47 represents a manifold for combustion-exhaust gas discharged from the combustion gas flow path; reference numeral 48 represents a circulating water inlet manifold; reference numeral 49 represents an outlet manifold for the circulating water discharged from the circulating water flow path 43; reference numeral 50 represents an inlet manifold through which the heat transfer medium supplied by the user flows into the manifold and reference numeral 51 represents an outlet manifold for the heat transfer medium discharged through the flow path 45.

The function of the integrated heat exchanger having such a structure are as follows. As shown in FIG. 4, combustion is performed in the combustion chamber 46 while feeding a fuel 32 and combustion air 33 to the heating burner 28, the resulting combustion gas flows in the direction of the exhaust gas manifold 47 through the combustion gas flow path and released in the air through the manifold 47.

On the other hand, the circulating water flows into the circulating water inlet manifold 48, and is transferred to the circulating water flow path 43 through the manifold and externally released through the circulating water outlet manifold 49.

The heat transfer medium supplied by the user flows into the heat medium inlet manifold 50 and is returned to the user through heat medium flow path and the heat medium outlet manifold 51.

As explained above, the combustion gas flow path, the circulating water flow path 43 and the heat transfer medium flow path 45 are arranged in layers through heat transfer plates. This ensures the occurrence of the heat exchange between the combustion gas passing through the combustion gas flow path, the circulating water passing through the flow path 43 and the heat transfer medium passing through the flow path 45.

When the fuel cell is started or the temperature of the fuel cell body 1 is raised, the fuel cell body 1 is heated by heating the circulating water through the heat exchange between the circulating water passing through the flow path 43 and the combustion gas generated from the heating burner 28 and passing through the combustion gas flow path.

On the other hand, when the fuel cell produces electric power and heat is supplied to users, the function of the integrated heat exchanger is as follows. If the demand for heat is greater than that for electric power, the heat exchanger deals with the unbalance between the demand for heat and that for electric power by performing the heat exchange between the combustion gas passing through the combustion gas flow path and discharged from the heating burner 28, the circulating water passing through flow path 43 and the heat transfer medium passing through the flow path 45, while maintaining the predetermined operating temperature of the fuel cell. In this case, the heat exchanger shows a quick response of heat supply to the user since the heat is transferred to the heat transfer medium through the heat exchange.

On the other hand, if the demand for heat is lower than that for electric power, the heat exchanger deals with the unbalance between the demand for heat and that for electric power by passing the combustion air through the combustion gas flow path without igniting the heating burner 28 and performing the heat exchange between the combustion air, the circulating water passing through the flow path 43 and the heat transfer medium passing through the flow path 45, while maintaining the predetermined operating temperature of the fuel cell. In this case, the heat exchanger shows a quick response of heat supply to the user since the heat is extracted from the heat transfer medium through the heat exchange.

In this embodiment, the water circulation system is provided with an integrated heat exchanger. Therefore, the heat supply and power-generating fuel cell can be made compact, there is not observed any delay of response due to the high heat capacity of the water to be heated in water vapor separator as in the foregoing embodiment, the fuel cell can effectively deal with the unbalance between the demand for heat and that for electric power during operating the cell while maintaining the desired operating temperature of the fuel cell.

Moreover, the fuel cell shows a quick response of heat supply to users since the heat transfer medium undergoes heat exchange with the combustion gas discharged from a heating burner or combustion air passing through the heating burner.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A heat supply and electric power-generating fuel cell, comprising a water-circulation system including:
    (1) a fuel cell body having a water flow path for controlling the temperature of a cell reaction to a proper temperature;
    (2) a thermometer for detecting the temperature of the cell reaction;
    (3) a water vapor separator for cooling water passed through said water flow path of said fuel cell body;
    (4) a recovery heat exchanger for constantly supplying heat to users, said heat corresponding to the difference between the temperature of the water cooled by said water vapor separator and the proper temperature of the cell reaction in said fuel cell body when the temperature of the water cooled by said water vapor separator is greater than the proper temperature of the cell reaction;
    (5) a control heat exchanger arranged on a water path connecting said water vapor separator with said recovery heat exchanger, said control heat exchanger including:
        (a) a heat exchange portion having a path for flowing a heat transfer medium arranged therein; and
        (b) cooling means for cooling said water passed through said control heat exchanger by air; and
    (6) a circulating pump for circulating water around a water-circulation circuit including said fuel cell body, said thermometer, said water vapor separator, said recovery heat exchanger and said control heat exchanger;

wherein an external controller controls the quantity of heat from said heating/cooling means on the basis of data from said thermometer to adjust the temperature of water heat-exchanged with said heat exchange portion when the temperature of the cell reaction during operating said fuel cell body is reduced, and controls the quantity of air supplied from said heating/cooling means toward said path of said heat exchange portion on the basis of data from said thermometer to adjust the temperature of water heat-exchanged with said heat exchange portion when the temperature of the cell reaction during operating said fuel cell body is increased.

2. A heat supply and electric power-generating fuel cell, comprising a water-circulation system including:
    (1) a fuel cell body having a water flow path for controlling the temperature of a cell reaction to a proper temperature;
    (2) a thermometer for detecting the temperature of the cell reaction;
    (3) a water vapor separator for cooling water passed through said water flow path of said fuel cell body;
    (4) a recovery heat exchanger for constantly supplying heat to users, said heat corresponding to the difference between the temperature of the water cooled by said water vapor separator and the proper temperature of the cell reaction in said fuel cell body when the temperature of the water cooled by said water vapor separator is greater than the proper temperature of the cell reaction;

(5) a control heat exchanger arranged on a water path connecting said water vapor separator with said recovery heat exchanger, said control heat exchanger including:

(a) a heat transfer medium-heat exchanger having a heat transfer medium, said heat transfer medium-heat exchanger for heat exchanging between water discharged from said water vapor separator and said heat transfer medium;

(b) an air-heat exchanger for heat exchanging between water heat-exchanged with said heat transfer medium of said heat transfer medium-heat exchanger and air supplied to said air-heat exchanger, wherein said air-heat exchanger and said heat transfer medium-heat exchanger are disposed in series; and (c) a heating/cooling means for heating said heat transfer medium of said heat transfer medium-heat exchanger or for supplying air to said air-heat exchanger to cool water discharged from said heat transfer medium-heat exchanger; and (6) a circulating pump for circulating water around a water-circulation circuit including said fuel cell body, said thermometer, said water vapor separator, said recovery heat exchanger and said control heat exchanger;

wherein an external controller controls the quantity of heat from said heating/cooling means on the basis of data from said thermometer to adjust the temperature of water heat-exchanged with said heat transfer medium-heat exchanger when the temperature of the cell reaction during operating said fuel cell body is reduced, and controls the quantity of air supplied from said heating/cooling means to said air-heat exchanger on the basis of data from said thermometer to adjust the temperature of water heat-exchanged with said air-heat exchanger when the temperature of the cell reaction during operating said fuel cell body is increased.

3. A heat supply and electric power-generating fuel cell, comprising a water-circulation system including:

(1) a fuel cell body having a water flow path for controlling the temperature of a cell reaction to a proper temperature;

(2) a thermometer for detecting the temperature of the cell reaction;

(3) a water vapor separator for cooling water passed through said water flow path of said fuel cell body;

(4) an integrated heat exchanger for simultaneously performing heating and heat-recovery of water discharged from said water vapor separator, said integrated heat exchanger including:

a recovery heat exchanger having a heat transfer medium for constantly supplying heat to users, said heat corresponding to the difference between the temperature of the water cooled by said water vapor separator and the proper temperature of the cell reaction in said fuel cell body when the temperature of the water cooled by said water vapor separator is greater than the proper temperature of the cell reaction; and a control heat exchanger including a heat exchange portion having a path for flowing a heat transfer medium arranged therein;

wherein said heat transfer medium is passed through said heat exchange portion of said control heat exchanger, and said heat transfer medium is passed through said recovery heat exchanger; and (5) a circulating pump for circulating water around a water-circulation circuit including said fuel cell body, said thermometer, said water vapor separator, said recovery heat exchanger and said control heat exchanger;

wherein an external controller controls the quantity of heat from said integrated heat exchanger on the basis of data from said thermometer to adjust the temperature of water heat-exchanged with said heat exchange portion when the temperature of the cell reaction during operating said fuel cell body is reduced.

4. A fuel cell as claimed in claim 1, further comprising a selector valve arranged in the flow path between said recovery heat exchanger and said fuel cell body of said water circulation system, said selector valve bypassing flow between said recovery heat exchanger and said fuel cell body to said water vapor separator.

5. A fuel cell as claimed in claim 2, further comprising a selector valve arranged in a flow path between said recovery heat exchanger and said fuel cell body of said water circulation system, said selector valve bypassing flow between said recovery heat exchanger and said fuel cell body to said water vapor separator.

6. A fuel cell as claimed in claim 3, further comprising a selector valve arranged in a flow path between said integrated heat exchanger and said fuel cell body of said water circulation system, said selector valve bypassing flow between said recovery heat exchanger and said fuel cell body to said water vapor separator.

* * * * *